United States Patent
Butt et al.

(10) Patent No.: US 7,392,420 B2
(45) Date of Patent: Jun. 24, 2008

(54) AUTOMATED ERROR RECOVERY OF A LICENSED INTERNAL CODE UPDATE ON A STORAGE CONTROLLER

(75) Inventors: Edward George Butt, Tucson, AZ (US); Jack Harvey Derenburger, Tucson, AZ (US); Steven Douglas Johnson, Tucson, AZ (US); Vernon J. Legvold, Tucson, AZ (US); Ronald David Martens, Benson, AZ (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 10/674,295

(22) Filed: Sep. 29, 2003

(65) Prior Publication Data

US 2005/0071721 A1    Mar. 31, 2005

(51) Int. Cl.
*G06F 11/00* (2006.01)
(52) U.S. Cl. .......................................................... 714/2
(58) Field of Classification Search ........................ None
See application file for complete search history.

(56) References Cited

U.S. PATENT DOCUMENTS

| | | | | |
|---|---|---|---|---|
| 5,210,854 A * | 5/1993 | Beaverton et al. | ........... | 717/174 |
| 5,579,222 A | 11/1996 | Bains et al. | ................. | 395/712 |
| 5,649,112 A * | 7/1997 | Yeager et al. | ............... | 709/220 |
| 5,745,879 A | 4/1998 | Wyman | ........................ | 705/1 |
| 5,758,069 A | 5/1998 | Olsen | .................... | 395/187.01 |
| 5,886,991 A | 3/1999 | Guarneri et al. | ............. | 370/389 |
| 5,905,860 A | 5/1999 | Olsen et al. | ............ | 395/187.01 |
| 6,357,021 B1 * | 3/2002 | Kitagawa et al. | .............. | 714/41 |
| 6,385,201 B1 | 5/2002 | Iwata | ......................... | 370/400 |
| 6,401,120 B1 | 6/2002 | Gamache | .................... | 709/226 |
| 6,418,554 B1 | 7/2002 | Delo et al. | ..................... | 717/11 |
| 6,553,507 B1 | 4/2003 | Cohen | ........................... | 714/4 |
| 6,668,374 B1 * | 12/2003 | Sten et al. | ..................... | 717/173 |
| 7,082,549 B2 * | 7/2006 | Rao et al. | ...................... | 714/6 |
| 2001/0011253 A1 | 8/2001 | Coley et al. | ................... | 705/59 |
| 2001/0013024 A1 | 8/2001 | Takahashi et al. | .............. | 705/59 |
| 2002/0116665 A1 | 8/2002 | Pickover et al. | ............... | 714/38 |
| 2002/0128976 A1 | 9/2002 | O'Connor et al. | ............. | 705/59 |
| 2002/0138745 A1 | 9/2002 | Cognigni et al. | ........... | 713/189 |
| 2002/0161718 A1 | 10/2002 | Coley et al. | ..................... | 705/59 |
| 2002/0194010 A1 | 12/2002 | Bergler et al. | ................... | 705/1 |
| 2003/0066062 A1 * | 4/2003 | Brannock et al. | ........... | 717/169 |
| 2004/0015952 A1 * | 1/2004 | Lajoie et al. | ................. | 717/171 |
| 2004/0054995 A1 * | 3/2004 | Lee | .............................. | 717/173 |
| 2004/0073902 A1 * | 4/2004 | Kao et al. | ..................... | 717/171 |
| 2004/0250245 A1 * | 12/2004 | Rao et al. | ..................... | 717/168 |
| 2005/0114852 A1 * | 5/2005 | Chen et al. | ................... | 717/168 |

* cited by examiner

*Primary Examiner*—Michael C Maskulinski
(74) *Attorney, Agent, or Firm*—Quarles & Brady, LLP; Dale F. Regelman

(57) ABSTRACT

A system, method and article of manufacture are provided for the automatic recovery from errors encountered during an automated Licensed Internal Code (LIC) update on a storage controller. The present invention functions with a concurrent or nonconcurrent automated LIC update. The automated recovery from many error conditions is transparent to the attached host system and on-site service personnel, resulting in an improvement in the LIC update process.

4 Claims, 5 Drawing Sheets

AUTOMATED ERROR RECOVERY OF A LICENSED INTERNAL CODE UPDATE ON A STORAGE CONTROLLER

CROSS-REFERENCES TO RELATED APPLICATIONS

The present application is related to application Ser. No. 10/674,300, entitled "Automated Control of a Licensed Internal Code Update on a Storage Controller", filed on an even date herewith, the disclosure of which is hereby incorporated by reference in its entirety.

FIELD OF THE INVENTION

The present invention relates to a Licensed Internal Code (LIC) update on a storage controller. More particularly, this invention provides an automated LIC update process with automatic recovery from errors encountered during the automated LIC update.

BACKGROUND OF THE INVENTION

Computing systems often include one or more host computers (hosts) for processing data and running application programs, direct access storage devices (DASDs) for storing data, and a storage controller for controlling the transfer of data between the hosts and the DASD. Storage controllers, also referred to as control units or storage directors, manage access to a storage space that often comprises numerous hard disk drives. Hosts may communicate Input/Output (I/O) requests to the storage space through the storage controller.

To maintain availability in the event of a failure, many storage controllers provide redundant hardware clusters. Each hardware cluster comprises a processor complex, cache, nonvolatile storage (NVS), and separate power supplies. The NVS in one cluster backs up write data from the cache in the other cluster so that if one cluster fails, the write data in the cache of the failed cluster is stored in the NVS of the surviving cluster. After a cluster fails, all I/O requests would be directed to the surviving cluster. When both clusters are available, each cluster may be assigned to handle I/O requests for specific logical storage devices configured within the physical storage devices.

It is necessary to periodically update the software on each of the clusters of the storage controller. Multiple hardware devices within each of the clusters may need software updates resulting in a complicated and time consuming process. This process is typically done manually by qualified service personnel. When problems are encountered during the update process the service personnel may have to perform repair actions and then start over with the software update process. This adds further to the time to update the software and may contribute to increased downtime for the storage controller. Frequently errors encountered during the LIC update result in returning to the beginning of the update process after a repair action. This adds further to the time required to perform the LIC software update and contributes to increased unavailability of the storage controller, directly impacting customer satisfaction and access. There is a need for an automated system that automatically recovers from errors and resumes operation of the LIC update process at an appropriate point in the LIC update process.

SUMMARY OF THE INVENTION

The present invention provides for the automatic recovery from errors encountered during an automated LIC update of a storage controller. The present invention functions with either a concurrent or nonconcurrent automated LIC update. The automated recovery from many error conditions is transparent to the attached host systems and any on-site service personnel, and therefore improves the LIC update time, reliability, and availability so that there is minimal interruption in system availability.

The present invention solves the problem where service personnel are required to be on-site to manage a LIC update on a storage controller. It also reduces the likelihood of service personnel induced errors, that in prior art systems required on-site service personnel intervention, resulting in the storage facility becoming unavailable to the customer.

An object of the present invention, therefore, is to provide an improved method for the automated LIC update process to automatically detect certain error conditions, attempt error recovery, and then continue automated LIC update with minimal service personnel intervention. This is a self healing error recovery process to enable the LIC update to continue without disrupting system operation.

Another object of the present invention is to temporarily suspend the automated LIC update when service intervention is required to repair a problem and then after the repair is completed allow the service personnel to resume the automated LIC update from the point of suspension. The advantage over prior systems being that the automated LIC update does not have to return to the very beginning of the LIC update process, instead it can continue from the point of failure and only execute the operations that are necessary to complete the LIC update.

A further object of the present invention is to automatically provide repair requests and information to service personnel when the automated LIC update suspends. This is accomplished by placing the system in a condition such that: (1) the machine can post open problems to the problem log, (2) the machine can "call home", and (3) the service personnel can perform the required repair(s).

A final object of the present invention is the reduction in service personnel repair time thus reducing the high warranty cost associated with a storage system.

The foregoing and other features and advantages of the invention will be apparent from the following more particular description of preferred embodiments of the invention, as illustrated in the accompanying drawings.

DETAILED DESCRIPTION OF THE INVENTION

Figure 1:
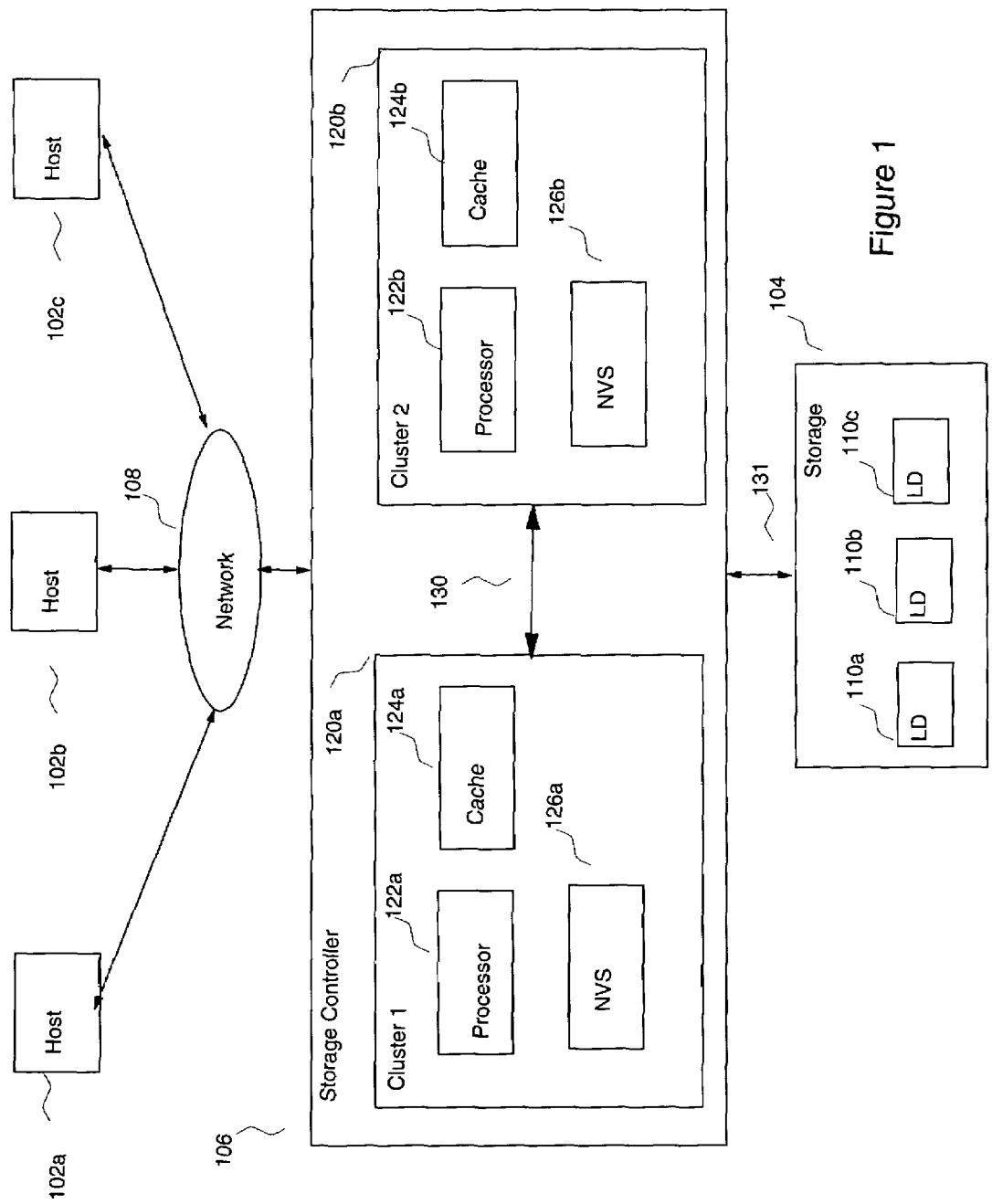
FIG. 1 is a block diagrammatic representation of the computing system environment that in which aspects of the present invention are implemented.

FIG. 1 illustrates a computing architecture in which aspects of the invention are implemented. One or more hosts 102a, 102b, . . . 102n are in data communication with a storage system 104, such as a DASD or other storage system known in the art, via a storage controller 106. The host 102 may be any computing device know in the art, such as a server, mainframe, workstation, personal computer, hand held computer, laptop, etc. The storage controller 106 and host system(s) 102 communicate via a network 108, which may comprise a storage area network (SAN), local area network (LAN), intranet, the internet, wide area network (WAN), etc. The storage system 104 may be comprised of hard disk drives, tape cartridge libraries, optical disks, or any suitable nonvolatile storage medium known in the art. The storage system 104 may be arranged as an array of storage devices, such as a DASD, redundant array of independent disks (RAID), virtualization device, etc. Storage controller 106 may comprise any storage controller or server known in the art. In certain implementations, the storage space 104 in storage controller 106 is configured as a plurality of logical devices (LD) 110a, 110b . . . 110n.

The storage controller 106 includes two separate clusters 120a, 120b for hardware components to provide redundancy for improved availability. Although the illustrated embodiment is described in connection with a storage controller having clusters, it is appreciated that the invention may be applicable to a variety of systems utilizing multiple processors in which one processor can direct operations to be executed by another processor.

Each cluster 120a, 120b of the illustrated embodiment may be maintained on a separate power boundary, and includes a processor complex 122a, 122b, a cache 124a, 124b and non-volatile storage (NVS) 126a, 126b. The NVS 126a, 126b may comprise a battery backed-up RAM or any other type of nonvolatile or volatile backup cache used to backup data in cache. The hosts 102a, 102b . . . 102n submit application I/O requests directed to a target logical device (LD) 110a, 110b . . . 110n, including write data, to the cluster 120a, 120b to which the target logical device (LD) 110a, 110b . . . 110n is assigned. The NVS 126a, 126b in one cluster 122a, 122b is used to backup write data in the cache 124b, 124a in the other cluster 120b, 120a, e.g., NVS 126a backs up write data in cache 124b.

Clusters 120a, 120b run independently and communicate with each other using communication line 130 while controlling the transfer of customer data to/from storage 104. Communication line 130 may be an ethernet connection between ports on each cluster. Two clusters result in greater availability in the case of failure on one of the clusters. If one cluster fails, the other will remain active and continue to manage the transfer of data until the other cluster is repaired and brought back online. This redundancy of clusters provides the system resources for the concurrent automated LIC update process where one cluster can perform the update on the other cluster while the other cluster can be effectively off-line during the update.

This invention provides three levels of error recovery procedures to further improve the automated LIC update on storage server 106. Each level of error recovery is designed to respond to the current conditions of operation of storage controller 106. For example, conditions of operations may be the type of error condition encountered, such as temporary firmware errors and permanent hardware errors.

The first level of error recovery occurs when the automated LIC update process automatically detects an error condition, performs the error recovery, and then continues when successful. Instead of attempting a recovery at every point of potential failure, each state action listed in a state action control table (explained below) will determine whether the execution of the state action was successful. If the execution of the state action was not successful then a specific Error Recovery Procedure (ERP) is invoked, based upon the state action that failed, in order to attempt recovery from the failure. Depending upon the success of the ERP execution, the ERP passes information to the dispatcher (explained below) that is used by the dispatcher to determine whether processing should continue, attempt a retry or in the case of a permanent error, suspend the LIC update.

The second level of error recovery occurs when the automated LIC update is suspended when service personnel are on-site and intervention is required to repair a problem. After the repair is complete, the service personnel will resume the automated LIC update from the point where it was suspended. The LIC update does not have to return to the beginning of the LIC update process, instead it may resume operation from the point where it failed, and therefore it only has to execute the operations that are necessary to complete the LIC update. In some cases the automated LIC update is able to continue precisely from the point where it failed. In other scenarios, the automated LIC update may have to "back-up" a few states in the state control table in order to return the machine to the proper state following the repair. If the failure occurs early in the automated LIC update process, a restart from the beginning is executed after the failure condition has been resolved.

The third level of error recovery occurs when the automated LIC update process suspends operation and service personnel are not on-site to provide intervention that may be required to repair a problem. When the process suspends, the system is in a state that (1) the storage controller 106 can post open problems to a problem log, (2) the storage controller 106 can "call home" requesting service, and (3) the service personnel can perform a repair action to restore system operation either on-site or remotely.

Previous to this invention, none of these three levels of error recovery existed. The automated LIC update process is designed to provide all three levels of error recovery, thus allowing autonomous updates without continual service personnel monitoring. If a problem occurs that requires service intervention, a "call home" occurs and the service personnel are notified via pager or other means that there is problem that needs attention.

This invention provides error recovery procedures to further improve the automated LIC update process. The automated LIC update process is controlled by an automated LIC dispatcher process that runs on the master cluster actively controlling the LIC update and activation. The dispatcher is an executable program that controls and manages the storage controller LIC update by calling a series of state actions from a state action table. The dispatcher, when first executed, initializes itself for the LIC update, calls the first state action in the state action table, and waits for that state action to complete. Once the state action has completed, the dispatcher retrieves the next state action, and so on until it reaches the end of the state action table. When the last state action in the state table has completed, the dispatcher completes clean up activities, and exits while completing the automated LIC update process. A state action may be generalized to include any executable instruction that carries parameters associated with the execution of the instruction without limitation.

Figure 2:
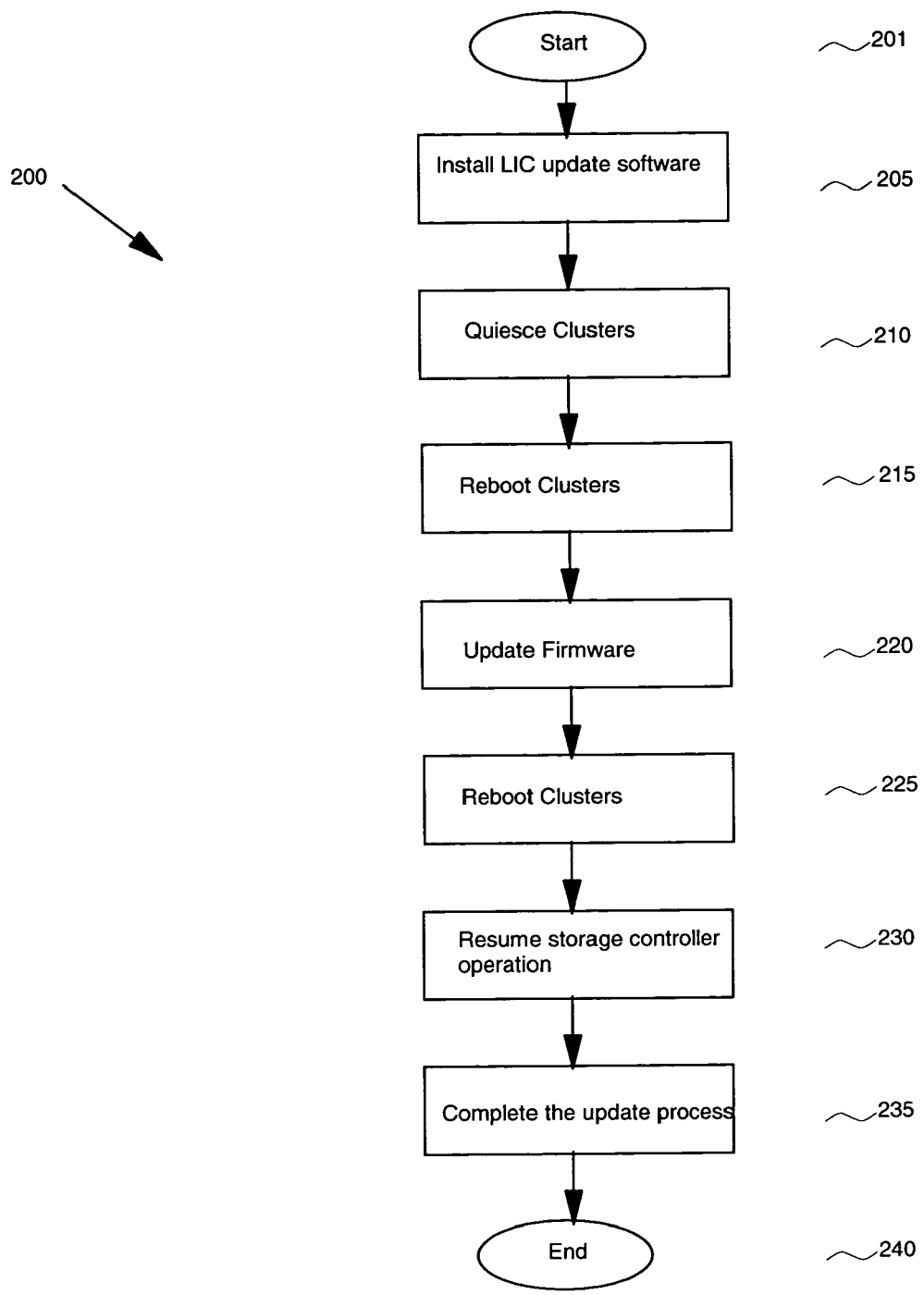
FIG. 2 contains flowchart 200 that shows the major tasks necessary to perform a automated LIC update.

FIG. 2 contains flowchart 200 that shows the major tasks that the dispatcher executes. A series of sub tasks may exist within each major task shown in flowchart 200. The execution of the tasks listed in flowchart 200 is controlled by the dispatcher and an associated state control table. Table 1 is an example of a state control table that may be used in the operation of the present invention. The major tasks shown in flowchart 200 are discussed first to provide an overview for the operation of the present invention. The details of the operation of the system to implement the tasks shown in flowchart 200 for both concurrent and nonconcurrent automated LIC updates are described in application Ser. No. 10/674,300, entitled "Automated Control of a Licensed Internal Code Update on a Storage Controller".

The automated LIC update process for a concurrent or nonconcurrent update begins with step 205 where the LIC software is installed on cluster 1, 120a and cluster 2, 120b. The LIC software is copied from a software source (for example compact disk read only memory (CD-ROM), master console internet access, etc.) to a specified installation directory on each cluster's hard drive. The LIC software is installed to each cluster's alternate (backup) drive using AIX operating system dual drive alternate disk installation commands. These commands apply the LIC software only to the backup drives and not to the primary boot drives.

At step 210, one or both clusters are quiesced depending upon whether it is a concurrent or nonconcurrent update. Quiescing a cluster is accomplished by setting the cluster into service mode. Quiescing informs the operating system that the cluster resource is now dedicated to executing the firmware update process and is unavailable for normal storage controller use while the LIC update is being applied to the hardware components on the cluster.

At step 215, one or both clusters are rebooted by cycling the power supplied to each cluster. When a cluster returns to operation after the reboot it will run on what was previously the backup drive which has the new installation of the LIC software. The storage controller firmware is not executed, instead, the operating system (OS) (for example Advanced Interactive Executive (AIX)) is in control of the cluster.

At step 220, the firmware is updated on one or both clusters. The devices updated may be for example, adapters, data controllers, rack power controllers, hardware controllers, data path controllers, and memory controllers. Automated LIC firmware update flags are written to disk for each device that is updated.

At step 225, one or both clusters are rebooted by cycling the power supplied to each cluster. This ensures that the cluster has updated all of the necessary components of the firmware update of step 220. This step may or may not be necessary depending upon the number of devices that received firmware updates at step 220, as indicated by the automated LIC firmware update flags.

At step 230 the storage controller resumes normal operation. I/O operations resume on the storage controller as it now becomes available to process data.

At step 235 the update process is completed by the verification of the code update. For example, processing logs are updated to reflect that the automatic LIC update process has completed, verification of the updates is processed to ensure that the system is fully operational, and the user is notified that the update process has successfully completed. At step 240 the process ends.

The automated LIC update process and the error recovery procedures of the present invention are accomplished by the automated LIC dispatcher executing each state action of an appropriate state action table. The automated LIC dispatcher process runs within either cluster 1 or cluster 2 depending upon the needs of the automated LIC dispatcher. The automated LIC dispatcher performs and verifies a series of operations to update all software necessary on any or all of the devices operating within the clusters.

Figure 3:
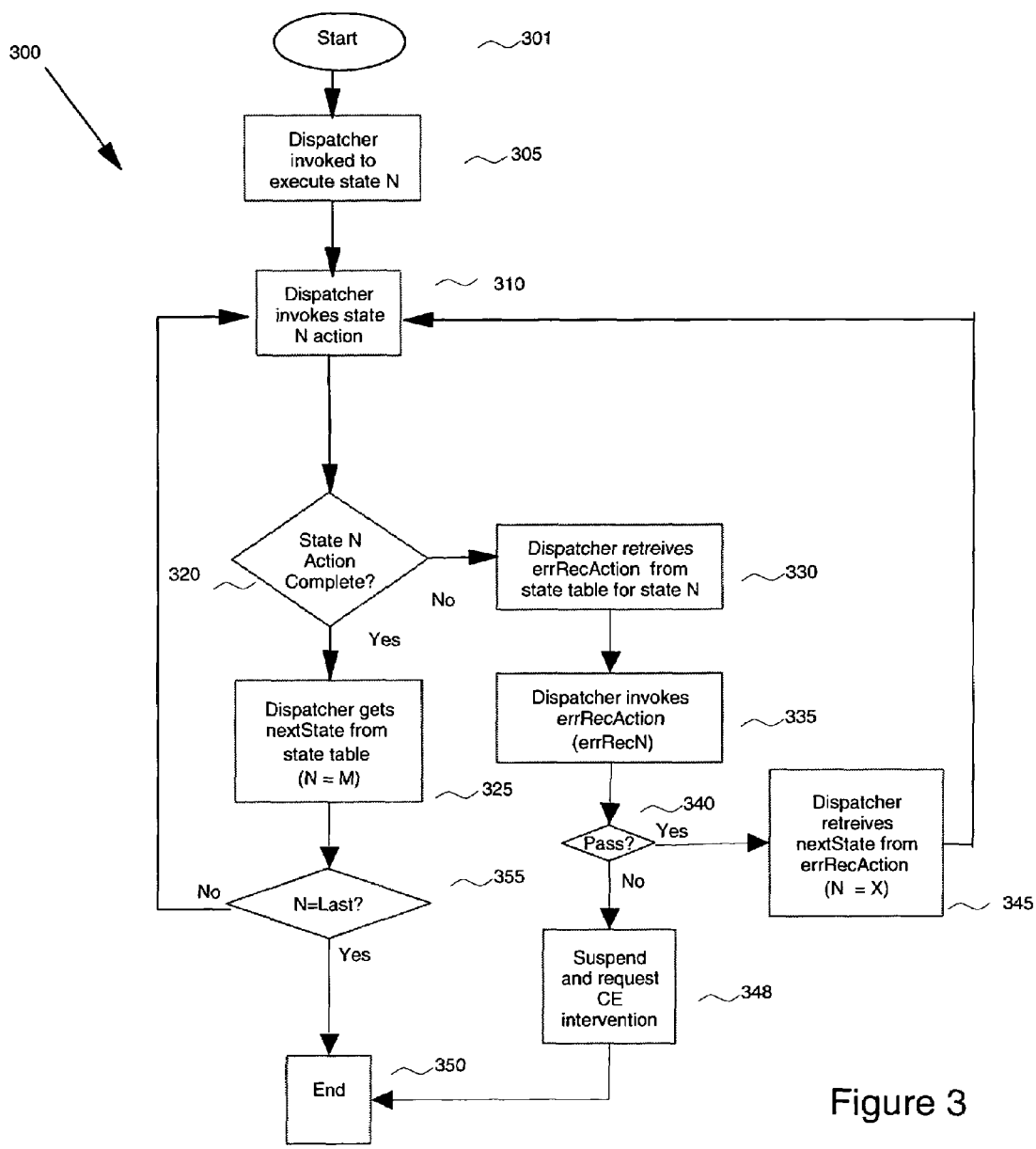
FIG. 3 contains flowchart 300 showing the operation of an automated dispatcher used to implement procedures of the present invention.

With reference to FIG. 3, the dispatcher operation for the present invention is now explained. Upon startup the dispatcher calls and executes the first state action in the appropriate state action table at step 310. Table 1 is an example of a state action table for use with the present invention. It will be recognized by those skilled in the art that variations to the contents of Table 1 are necessary depending upon the configuration and operating conditions of storage controller 106. The state action table shown in Table 1 consists of rows of individual state actions required to perform the LIC update with error recovery procedures. Each row contains a value indicating the current state, the action to execute, the next state in the table to execute after the current state action has completed, the error recovery action, and a reEntry state to enter after executing an ERP. For the example shown in Table 1, the sequence of states in the state table begins with the state action of installing the LIC update software at state action 1. State actions to perform the necessary hardware updates follow and the state actions complete at state action 60, with the verification state confirming that the update was complete and successful. The information contained in a state table may be stored in a memory device (for example, RAM, ROM, DASD, etc.) associated with storage controller 106.

The first column of Table 1 is the state number N which represents any state that has a specific state action to be executed. The state action to be executed is listed in the second column of Table 1. The third column indicates the next state, M, that needs to be executed after the successful completion of the current state N. The fourth column is the error recovery action to execute in the event that an error is encountered while executing the current state. The fifth column is the reEntry state to enter after an automated LIC update suspension and successful CE repair.

The first, second, and third column entries for Table 1 and the operation of the dispatcher is described in more detail in application Ser. No. 10/674,300, entitled "Automated Control of a Licensed Internal Code Update on a Storage Controller". The error recovery entries of Table 1 (columns 4 and 5) are specific to this invention and will now be explained in the context of the dispatcher operation. When the execution of a state action fails, the dispatcher invokes the error recovery action, ErrRecAction, corresponding to the current state, N (fourth column of Table 1). The error recovery action executes recovery procedures if necessary, to attempt to restore storage controller 106 to a desired condition that will allow the dispatcher to either continue with the next state action or re-execute the current state action. The error recovery action, when completed, returns status information indicating failure or success. A failed status indicates that repair of storage controller 106 is necessary before the LIC update can continue. A success status includes an additional parameter, X, that is passed to the dispatcher to direct the dispatcher to select the next state action to execute. The parameter, X, will indicate to the dispatcher whether it should execute the current state action (retry) or the next state action (continue), or additional options.

TABLE 1

State Action Table

| State N | Action Action for state N | Next State M | Error Recovery Action ErrRecAction | Reentry State Y |
|---|---|---|---|---|
| 1 | install | 2 | ErrRecInstall | 1 |
| 2 | quiesce | 3 | ErrRecQuiesce | 1 |
| 3 | reboot | ... | ErrRecReboot | 100 |
| ... | ... | ... | ... | ... |
| 59 | resume | 60 | ErrRecResume | 59 |
| 60 | complete | Last | ErrRecComplete | 60 |
| 100 | reenterVerify | 101 | ErrRecVerify | 100 |
| 101 | reenterStep1 | 102 | ErrRecStep1 | 100 |
| 102 | reenterStep2 | 103 | ErrRecStep2 | 100 |
| 103 | reenterStep3 | 3 | ErrRecStep3 | 100 |

The reEntry state column indicates which state action, Y, that the dispatcher should execute when the automated LIC update process is reentered after an automated LIC update suspension and subsequent customer engineer (CE) repair. For example, if there is an unrecoverable error that causes the automated LIC process to suspend and request CE intervention during states 1 (install) or 2 (quiesce), then the CE services the storage controller and restarts the automated LIC update process, whereupon the dispatcher invokes state number 1—in essence, the automated LIC update process starts over from the beginning.

Another example of a reEntry state is with reference to state action three which is used herein for illustrative purposes only. If the reboot of state action of state 3 fails and the error recovery action also fails, then the update process is suspended and a CE is called to perform a repair action. Upon completion of the repair, the CE reenters the LIC update process and the dispatcher executes reEntry state, 100, as indicated by the reentry state column for state 3. Assuming no additional errors, the dispatcher executes state 100, then 101, 102, and 103, and finally back to state 3 whereupon the reboot action is executed and the dispatcher continues on through the remainder of the state table in the normal manner.

Referring again to FIG. 3, the dispatcher determines at step 320 if the execution of state action, N, is complete. If the execution of state action, N, is complete then the dispatcher retrieves the next state action, M, from the state action table and assigns N=M. At step 355, state action, N (N=M) is examined to determine if it is the last state action in the state action table. If state action, N, is the last state action in the state action table then step 355 transfers control to step 350 where the dispatcher ends operation. To identify the last state action there may be an entry in the next state column of the state action table that identifies the next state action for state action, N, as the last state. For example, if the current state action executing is 30 and the next state action entry in the state action table is identified as last, then state action 30 will be the last state action to execute. If state action, N, is not the last state action in the state action table then step 355 transfers control to step 310. At step 310, the dispatcher executes state action, N, (N=M) in the same manner as described above for any state action, N.

If it is determined at step 320, that the execution of state action, N, is not complete then the dispatcher executes step 330. At step 330, the dispatcher retrieves the error recovery action, ErrRecAction, for state action, N, from the state action table. At step 335, the dispatcher invokes the error recovery action, ErrRecAction, for state action, N. The error recovery action attempts to recover to a condition that allows the dispatcher to continue without external intervention (as described above). At step 340, the results of executing the error recovery action, ErrRecAction, for state action, N, are examined by the dispatcher to determine if it passed or failed. If the error recovery action, ErrRecAction, for state action, N, failed then step 348 is executed. At step 348, the operation of the storage controller is suspended and a customer engineer (CE) is contacted to service the storage controller. Contacting the CE may be the result of a call home action, a CE inquiry to the storage controller unit through electronic login processes common to the trade, pager, or by other means common to the service industry. From step 348, control is transferred to step 350 where the operation of the dispatcher ends until the CE restores operation of the storage controller.

If at step 340, the results of executing the error recovery action, ErrRecAction, for state action, N, passed, then control flows to step 345. At step 345 the dispatcher retrieves the next state action, X, that was computed in the Error Recovery Action and sets N=X. From step 345 control passes to step 310 where state action N=X is executed by the dispatcher as described above.

Figure 4:
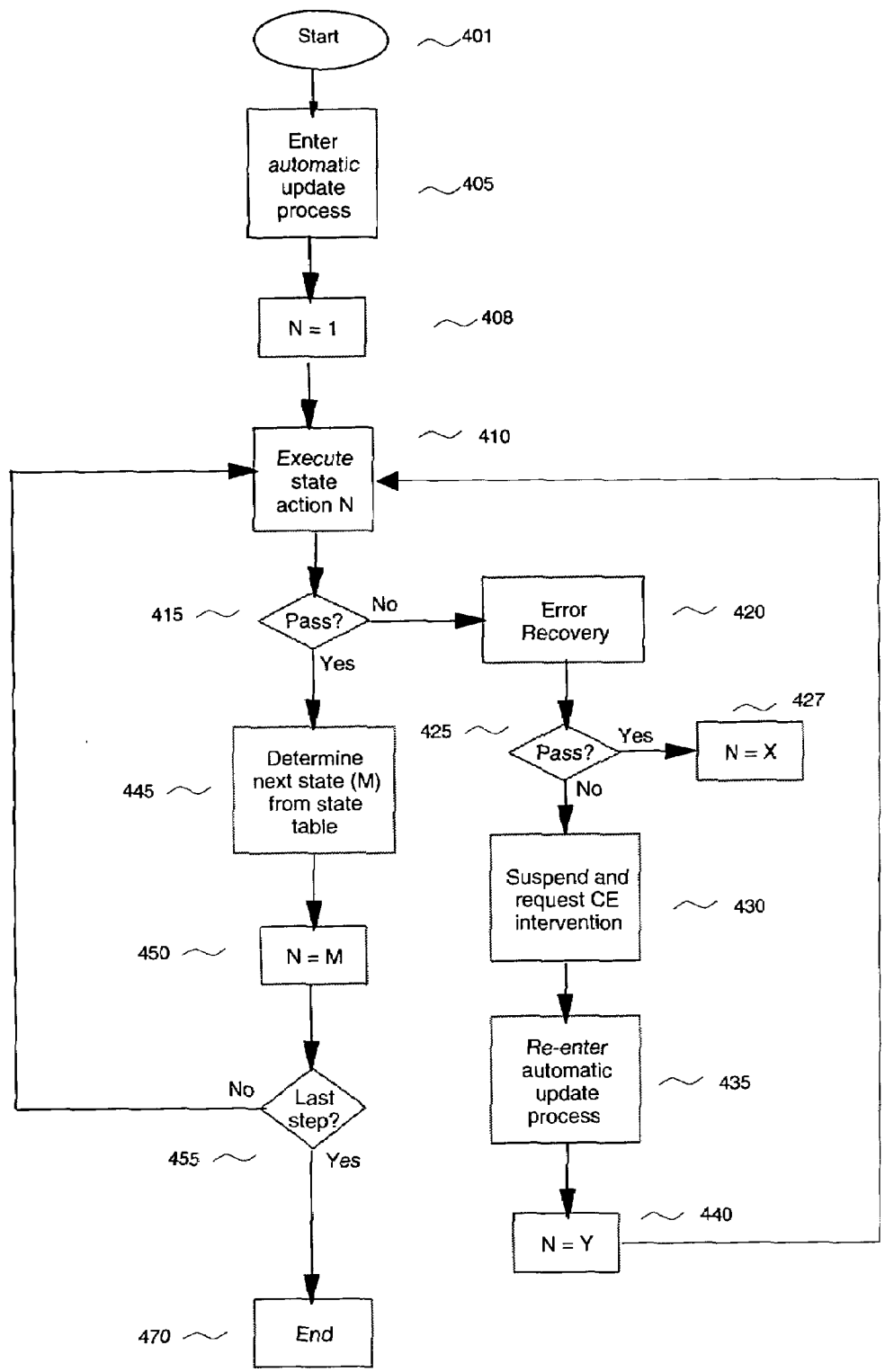
FIG. 4 contains flowchart 400 that details the steps to accomplish an automated LIC update with error recovery.

With the previous explanation of the dispatcher completed the operation of the present invention is now described with reference to flowchart 400 shown in FIG. 4. The steps of flowchart 400 provide automated error recovery while performing an automated LIC update on storage controller 106. The process begins by the execution of step 405, where the automated LIC update process begins. At step 408 the first state action, N, is set equal to 1. The dispatcher calls each state from the appropriate state action table and executes the action defined by state N at step 410. The first state action executed at step 410 is state action 1. For example state action 1 from the state action Table 1 described previously is to install the LIC update software on the clusters of the storage controller. At step 415, the dispatcher examines the return status for state action N to determine if state action N executed without errors. The return status for the execution of a state action provides information to the dispatcher about the execution of the state action, for example, the return status may contain the pass/fail status, the hardware component that failed, the specific internal process that failed to complete, etc. If state action N executed without errors then step 445 is executed, otherwise step 420 is executed. At step 445, the dispatcher examines the next state action, M, in the state action table (for example, column 3 of Table 1) and assigns state action, N=M. At step 450 the dispatcher examines state action, N (N=M) to determine if it is the last state action to be executed. If it is the last state action to be executed then the process ends at step 470 indicating that the LIC update process is complete. If it is determined at step 455 that state action, N, is not the last state action to be executed then the process returns to step 410 to execute state action, N (N=M). If at step 415 any state action, N, that is executed returns an error code for the error status of the execution of state action, N, then step 420 is executed. At step 420 an error recovery procedure is invoked, the details of which are explained below with reference to flowchart 500 of FIG. 5.

After execution of the error recovery procedure of step 420, step 425 is executed. At step 425 the error recovery status is examined to determine if the error recovery procedure exited with a pass or fail output. If the error recovery procedure passed then step 427 is executed. At step 427 the current state action, N, is set to the error recovery passed state action, X, (N=X). Error recovery passed state action, X is obtained by the error recovery procedure, the details of which are explained below with reference to flowchart 500 of FIG. 5. After execution of step 427, the current state action, N, (N=X)

is executed at step 410. Exiting the error recovery procedure with a passed status and the error recovery passed state action, X, enables the dispatcher to reenter the LIC update process at a state action determined by the recovery process, therefore allowing programming flexibility. The process flows from step 410 as described above.

If at step 425, the error recovery procedure failed then step 430 is executed. At step 430 the operation of the storage controller is suspended and a request is sent for a customer engineer (CE) to service the storage controller. The request may be the result of a call home, a CE inquiry to the storage controller unit through electronic login processes common to the trade, pager, or by other means common to the service industry. The CE will repair the storage controller 106 by running diagnostic software to identify problem components, replacing components, etc., to restore operation of storage controller 106. After the CE performs the repair action, the automated LIC update process is invoked and it automatically enters the update process where it previously ended at step 430. The dispatcher retrieves the reEntry state, Y, from the state action table (for example, column 5 of Table 1). After execution of step 440, the current state action, N, (N=Y) is executed at step 410. The process flows from step 410 as described above.

The automated LIC update process is designed to be completely automated while the service personnel is on-site or off-site. Many errors are recovered automatically without user intervention. Only hard failures that require service intervention will cause the automated LIC update to suspend until the failure condition is resolved. Once resolved, the automated LIC update process continues from the point of failure until it is finished eliminating the need to start over from the beginning.

Figure 5:
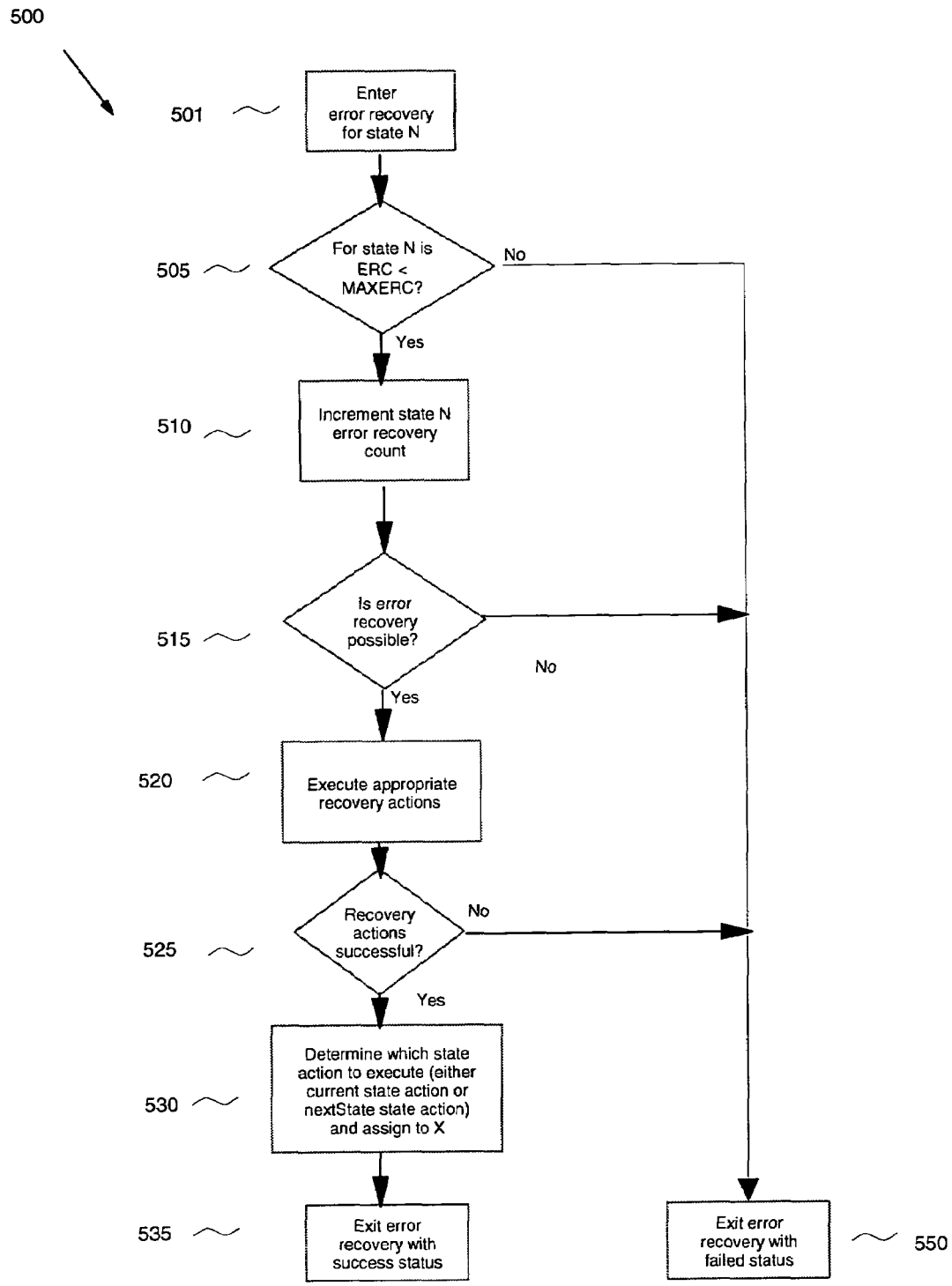
FIG. 5 contains flowchart 500 that details the steps to accomplish error recovery procedures of the present invention.

The error recovery procedure of step 420, is now explained with reference to flowchart 500, shown in FIG. 5. Entry into the error recovery procedure at step 501, for state action, N, is initiated by the execution of step 420 (FIG. 4). At step 505, the error recovery count for state action, N, is examined. There is a unique error recovery count, ERC, and a unique maximum error recovery count, MAXERC, for each state action, N. If the error recovery count, ERC, for state action, N, is less than the maximum error recovery count, MAXERC, (ERC<MAXERC) then step 510 is executed, otherwise step 550 is executed. At step 550 the error recovery procedure exits to step 425 (FIG. 4) with a failed result. If ERC<MAXERC, then the error recovery count, ERC, is incremented by one count at step 510, and then step 515 is executed. At step 515, the storage controller error conditions are analyzed to determine if any error recovery is possible. Error recovery may not be possible because of hardware failures, unanticipated storage controller states, etc. If at step 515, it is determined that error recovery is not possible, then step 550 is executed with the result that the error recovery procedure exits to step 425 (FIG. 4) with a failed result. If at step 515, it is determined that error recovery is possible, then step 520 is executed.

At step 520, recovery actions are executed to recover from the current error condition. For example, a recovery action may be to retry an install or quiesce operation. In the preferred embodiment, the error recovery action is obtained from the state action table, for example column 3 of Table 1. At step 525 the result of the recovery action is examined to determine if the recovery action was successful. If at step 525 it is determined that the recovery action was not successful, then step 550 is executed with the result that the error recovery procedure exits to step 425 (FIG. 4) with a failed result. If at step 525, it is determined that the recovery action was successful, then step 530 is executed. At step 530, the next state action to be executed is determined. For example, the next state action may be determined by ascertaining if the current state, N, has met its completion criterion. If it has met its completion criterion, then it may continue to the next state, M; otherwise, it must repeat the current step, N. Other criterion may be used to determine the error recovery passed state action, X, without limitation. In any case, error recovery passed state action, X, is assigned the state number that needs to be executed after successful error recovery as determined by the error recovery procedure. The next state action obtained is assigned to the error recovery passed state action, X, and step 535 is executed. At step 535, the error recovery procedure exits to step 425 (FIG. 4) with a passed result, and the error recovery passed state action, X, obtained at step 530 is passed to step 427 of flowchart 400.

The principles of the present invention now have been made clear in the illustrated embodiments. They will be immediately obvious to those skilled in the art, many modifications of structure, arrangement, proportions, elements, materials and components used in the practice of the invention. The appended claims are, therefore, intended to cover and embrace any such modifications within the true spirit and scope of the invention.

We claim:

1. A method for automated error recovery of a storage controller Licensed Internal Code ("LIC") update process, comprising the steps of:

running an automated LIC dispatcher process that retrieves a state action from a state action table and executes said state action;

determining if said state action has executed with at least one error;

in response to determining that said state action has executed with at least one error, entering an error recovery procedure;

determining if an error recovery count for a current state action is less than a maximum error recovery count;

in response to determining that an error recovery count for a current state action is less than a maximum error recovery count, incrementing said error recovery count, otherwise exiting said error recovery procedure with a failed status;

determining if an error recovery is possible;

in response to determining that an error recovery is possible, executing at least one error recovery action, otherwise exiting said error recovery procedure with said failed status;

determining if said at least one error recovery action was successful;

in response to determining that said at least one error recovery action was successful, determining a recovery passed state action, and exiting said error recovery procedure with a passed status, otherwise exiting said error recovery procedure with said failed status;

in response to determining that said state action has not executed with at least one error, retrieving a next state action;

determining if said next state is a last state action;

in response to determining that said next state action is not a last state action, returning to said executing step; and in response to determining that said next state action is a last state action, ending said storage controller LIC update process.

2. The method of claim 1, further comprising the step of retrieving said error recovery action from a state action table.

3. The method of claim 1, further comprising the steps of:

in response to exiting said automated error recovery process with a failed status:

suspending storage controller operation;

requesting repair of said storage controller;

after repair of said storage controller, reentering said update process at a reEntry state action obtained from a state action table.

4. The method of claim 3, wherein the requesting step further comprises the steps of:

automatically contacting a customer engineer; and sending diagnostic, location, and customer information to said customer engineer.

* * * * *